United States Patent
Liao et al.

(10) Patent No.: US 12,269,077 B2
(45) Date of Patent: Apr. 8, 2025

(54) DISPOSAL METHOD FOR WASTE FABRIC CONTAINING POLYESTER AND NYLON

(71) Applicant: NAN YA PLASTICS CORPORATION, Taipei (TW)

(72) Inventors: Te-Chao Liao, Taipei (TW); Jung-Jen Chuang, Taipei (TW); Tzu-Huan Wong, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 703 days.

(21) Appl. No.: 17/568,730

(22) Filed: Jan. 5, 2022

(65) Prior Publication Data

US 2023/0132027 A1  Apr. 27, 2023

(30) Foreign Application Priority Data

Oct. 21, 2021 (TW) .................................. 110139088

(51) Int. Cl.
*B09B 3/70* (2022.01)
*B09B 101/85* (2022.01)

(52) U.S. Cl.
CPC ............ *B09B 3/70* (2022.01); *B09B 2101/85* (2022.01)

(58) Field of Classification Search
CPC ....... B09B 3/00; B09B 3/0066; B09B 3/0075; B09B 3/80; B09B 2101/85; B09B 5/00; B09B 3/70
See application file for complete search history.

(56) References Cited

U.S. PATENT DOCUMENTS

| | | |
|---|---|---|
| 3,696,058 A | 10/1972 | Teti |
| 5,241,066 A | 8/1993 | Davis et al. |

(Continued)

FOREIGN PATENT DOCUMENTS

| | | |
|---|---|---|
| CN | 1747982 | 3/2006 |
| CN | 1957027 | 5/2007 |

(Continued)

OTHER PUBLICATIONS

"Office Action of Taiwan Related Application, Application No. 111102618", issued on May 15, 2024, p. 1-p. 7.

(Continued)

*Primary Examiner* — Ian A Rummel
*Assistant Examiner* — Eric Scott Sherman
(74) *Attorney, Agent, or Firm* — JCIPRNET

(57) ABSTRACT

A disposal method for waste fabric containing polyester and nylon includes: step (a): providing a waste fabric containing polyester and nylon; step (b): performing a first-stage treatment including acid treatment on the material to obtain a first liquid material and a first solid material; step (c): performing a second-stage treatment on the first liquid material to obtain a second liquid material and a second solid material; step (d): performing a third-stage treatment including acid treatment on the first solid material to obtain a third liquid material and a third solid material; step (e): performing a fourth-stage treatment on the third liquid material to obtain a fourth liquid material and a fourth solid material, wherein the acid concentration of the second liquid material is lower than the acid concentration of the first liquid material, and the acid concentration of the fourth liquid material is lower than the acid concentration of the third liquid material.

12 Claims, 1 Drawing Sheet

(56) References Cited

U.S. PATENT DOCUMENTS

| | | |
|---|---|---|
| 5,849,804 A | 12/1998 | Sarian et al. |
| 5,889,142 A | 3/1999 | Mohajer et al. |
| 5,898,063 A | 4/1999 | Stefandl |
| 6,140,463 A | 10/2000 | Stefandl |
| 2013/0296525 A1* | 11/2013 | Waibel ............ C08J 11/08 528/367 |
| 2023/0127947 A1* | 4/2023 | Liao ............ C08J 11/14 521/48 |

FOREIGN PATENT DOCUMENTS

| | | | |
|---|---|---|---|
| CN | 107849206 | | 3/2018 |
| CN | 106146877 | | 2/2019 |
| CN | 109467741 | | 3/2019 |
| CN | 110790980 | * | 2/2020 ............ C08J 11/06 |
| CN | 111621059 | | 9/2020 |
| CN | 111868316 | | 10/2020 |
| CN | 113073461 | | 7/2021 |
| JP | H09255810 | | 9/1997 |
| JP | H10195233 | | 7/1998 |
| JP | H10512909 | | 12/1998 |
| JP | 2008031127 | | 2/2008 |
| JP | 2018534184 | | 11/2018 |

OTHER PUBLICATIONS

"Office Action of Taiwan Counterpart Application", issued on Jun. 6, 2022, p. 1-p. 3.

"Office Action of Taiwan Counterpart Application", issued on Sep. 5, 2022, pp. 1-6.

"Office Action of Japan Counterpart Application", issued on Oct. 10, 2023, p. 1-p. 3.

"Office Action of Taiwan Related Application, Application No. 111102618", issued on Nov. 17, 2022, p. 1-11.

"Office Action of Taiwan Related Application, Application No. 111102619", issued on Nov. 17, 2022, p. 1-8.

* cited by examiner

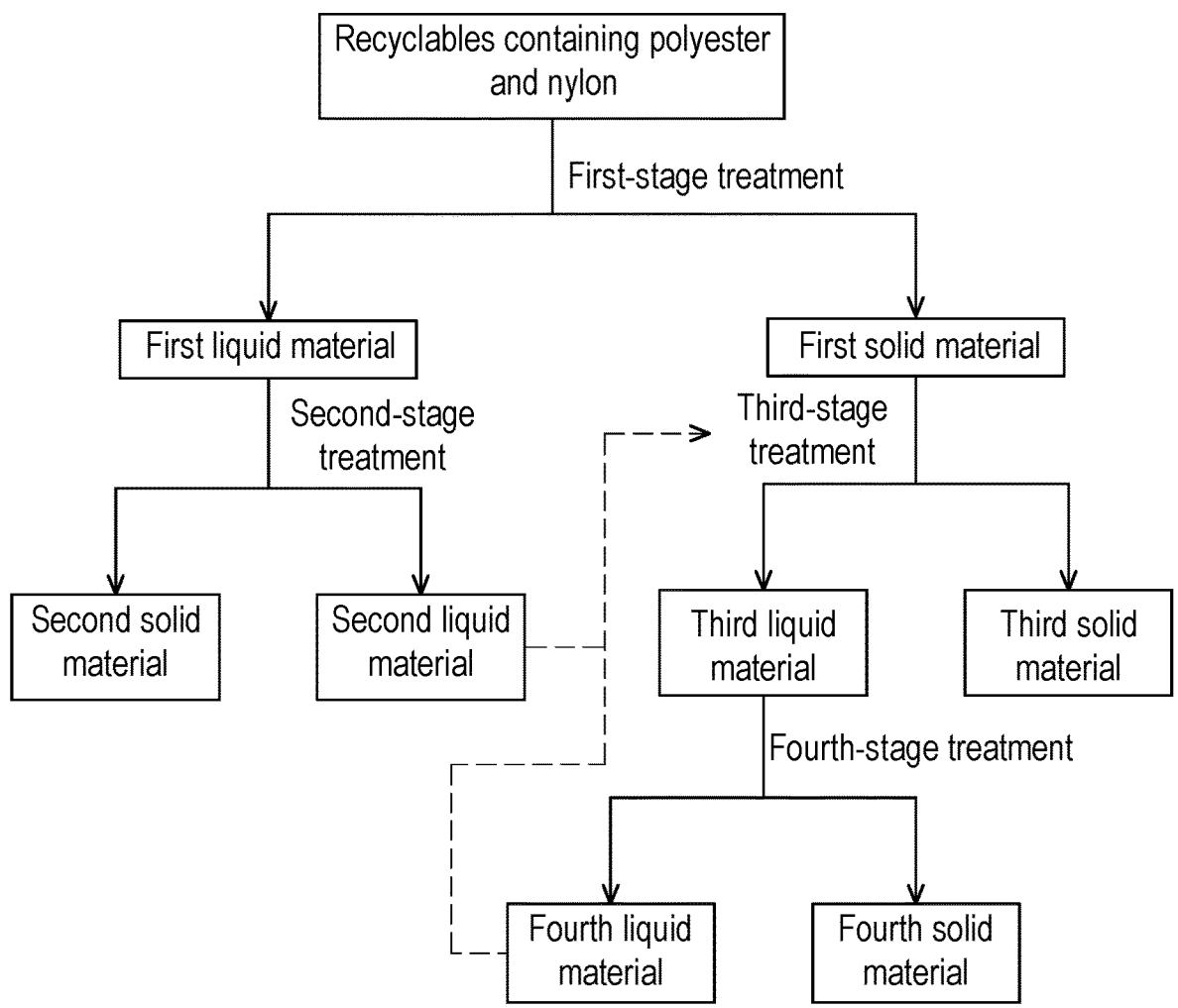

DISPOSAL METHOD FOR WASTE FABRIC CONTAINING POLYESTER AND NYLON

CROSS-REFERENCE TO RELATED APPLICATION

This application claims the priority benefit of Taiwan application serial no. 110139088, filed on Oct. 21, 2021. The entirety of the above-mentioned patent application is hereby incorporated by reference herein and made a part of this specification.

BACKGROUND

Technical Field

The disclosure relates to a disposal method for waste fabric, and particularly to a disposal method for waste fabric containing polyester and nylon.

Description of Related Art

Polyester fibers and nylon fibers are fabrics commonly seen in the market and our daily lives. For example, polyester fibers can be co-woven with nylon fibers and then made into all kinds of fabric, such as hats, clothes, pants, skirts, and socks, using conventional approaches in textile or garment industry. With the awakening environmental awareness of these days, it has become a research in progress to recycle polyester and/or nylon in these co-fabrics and/or dispose the polyester wastes.

SUMMARY

The disclosure is directed to a disposal method for waste fabric containing polyester and nylon, which reduces an overall usage amount of acid liquid and/or increases a recycle amount of polyester and/or nylon.

The disclosure provides a disposal method for waste fabric containing polyester and nylon, which includes following steps. Step (a): providing a waste fabric containing polyester and nylon; step (b): performing a first-stage treatment on the waste fabric to obtain a first liquid material and a first solid material. Step (c): performing a second-stage treatment on the first liquid material to obtain a second liquid material and a second solid material. Step (d): performing a third-stage treatment on the first solid material to at least obtain a third liquid material and a third solid material. Step (e): performing a fourth-stage treatment on a third liquid material to obtain a fourth liquid material and a fourth solid material. The first-stage treatment includes acid treatment. An acid concentration of the second liquid material is lower than an acid concentration of the first liquid material. The third-stage treatment includes acid treatment. An acid concentration of the fourth liquid material is lower than an acid concentration of the third liquid material. The third solid material includes recycled polyester, the second solid material includes recycled nylon, or the fourth solid material includes recycled nylon.

Based on the above description, through the above steps, the disposal method for waste fabric containing polyester and nylon of the disclosure is adapted to reduce the overall usage amount of acid liquid and/or increase the recycle amount of nylon and/or polyester.

BRIEF DESCRIPTION OF THE DRAWINGS

The FIGURE is a partial schematic flowchart of a disposal method for waste fabric containing polyester and nylon according to an embodiment of the disclosure.

DESCRIPTION OF THE EMBODIMENTS

In the following detailed description, for the sake of explanation and not limitation, exemplary embodiments revealing specific details are set forth to provide a thorough understanding of various principles of the disclosure. However, it will be obvious to those skilled in the art that, benefiting from the disclosure, the present disclosure may be practiced in other embodiments that depart from the specific details disclosed herein. In addition, the description of well-known devices, methods, and materials may be omitted so as not to obscure the description of various principles of the disclosure.

A range may be expressed herein as from "about" a specific value to "about" another specific value, and may also be directly expressed as a specific value and/or to another specific value. When expressing the range, another embodiment includes from the one specific value and/or to another specific value. Similarly, when the value is expressed as an approximate value by using the antecedent "about", it will be understood that the specific value forms another embodiment. It will be further understood that an endpoint of each range is obviously related to or independent from the other endpoint.

In the specification, non-limiting terms (such as possible, may be, for example, or other similar terms) are unessential or optional implementations, inclusions, additions or existences.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

[Recyclables]

Recyclables containing polyester and nylon are provided.

In an embodiment, a method of obtaining recyclables may include: collecting various types of recyclables or wastes containing nylon; and performing corresponding sorting according to types, colors, and/or usage purposes of the aforementioned recyclables. The aforementioned recyclables may include, for example, clothing, but the disclosure is not limited thereto. Generally, a label on regular clothing may indicate a used fiber composition.

In an embodiment, the recyclable containing nylon may be further subjected to one of following pre-treatments (i.e., the treatments before subsequent treatment; essentially still recyclable): removing objects (such as: clips, fasteners, ornaments, labels and/or other objects obviously not containing nylon) on the recyclable; performing preliminary cleaning on the recyclable (such as washing stains, throwing off impurities, etc., but the disclosure is not limited thereto); using physical methods (such as: shearing, trimming, cutting or chopping, but the disclosure is not limited thereto) to reduce a single size of the recyclable; and/or, drying the recyclable.

In an embodiment, the method of obtaining the recyclable may also include, for example, directly purchasing the processed nylon-containing recyclable.

It should be noted that the term "nylon" in the specification includes polymers commonly referred to as nylon, such as: nylon 66, nylon 6, nylon 510, nylon 1,6, other similar polymers including polyamide functional groups and similar to the aforementioned polymers, copolymers of the above materials or co-fabrics of the above materials.

It should be noted that the term "polyester" in the specification includes polymers commonly referred to as polyesters, particularly aromatic polyesters, and particularly refers to polyesters derived from purified terephthalic acid (PTA) and ethylene glycol (EG) (i.e., polyethylene terephthalate (PET)).

In addition, the polyester in the specification may also be, for example, polytrimethylene terephthalate, polybutylene terephthalate, polyethylene naphthalate, or a combination of the above materials. In the embodiment, the polyester is preferably polyethylene terephthalate, polytrimethylene terephthalate or a combination thereof. In addition, a copolymer may also be used, which specifically refers to a copolymer that may be obtained by using two or more dicarboxylic acids and/or two or more diol components.

[First-Stage Treatment]

A first-stage treatment is performed on the aforementioned recyclable to obtain a first liquid material and a first solid material.

It should be noted that the term "liquid material" used herein is not limited to that the material must be completely liquid. For example, the "liquid material" may include a liquid; and a suspended substance suspended in or suspended on the liquid. A particle size of the above suspended substance may be 1 millimeter (mm) or less; or, according to the ASTM E11-01 standard, the above suspended substance may pass through a sieve with a mesh number of 18 or greater. For another example, the "liquid material" may include polymer colloid or other similar colloids.

It should be noted that the term "solid material" in the specification is not limited to that the material must be completely solid. For example, the "solid material" may include a solid; and a liquid attached to the solid or located between two solids by capillary phenomena. The "solid material" may be dried by an appropriate method (such as heating and/or vacuum drying) to obtain the solid with almost no liquid. Regarding a total weight of the "solid material", a weight of the solid after drying may be about 80% or more; which is preferably about 90% or more; and more preferably about 95% or more.

In the embodiment, the first-stage treatment may include acid treatment. For example, the aforementioned recyclable may be immersed in acid liquid, and then the first liquid material and the first solid material may be separated from each other by an appropriate method (such as filtering with a screen; but the disclosure is not limited thereto).

In an embodiment, the acid treatment of the first-stage treatment may be to immerse the recyclable in acid liquid (which may be referred to as: pickling).

In an embodiment, the acid treatment of the first-stage treatment may be to immerse the recyclable in acid liquid for heating (for example, heated to about 50±5° C.), but the disclosure is not limited thereto.

In an embodiment, the acid treatment of the first-stage treatment may also be to immerse the recyclable in acid liquid and stir and/or leave for standing still (for example, stirring and/or standing still for more than 30 minutes; or, stirring and/or standing still for more than 60 minutes), but the disclosure is not limited thereto.

In an embodiment, the acid treatment of the first-stage treatment may be performed by using an aqueous solution of an organic acid. If nitric acid, hydrochloric acid or sulfuric acid is used, it is easy to damage an acid treatment tank (such as: a pickling tank; but the disclosure is not limited thereto) or other possible metal tools (such as: stainless steel tools; but the disclosure is not limited thereto). The sulfuric acid may probably cause dissolving of other non-nylon fibers (such as polyester fibers) to reduce separability between the liquid material and the solid material. Hydrofluoric acid is more likely to cause industrial safety hazards. Oxalic acid has low water solubility (for example, about 14.3 g/100 ml@25° C.), so that it is difficult to prepare a high-concentration aqueous solution at room temperature to dissolve nylon.

Phosphoric acid has poor solubility for nylon.

In an embodiment, the acid treatment of the first-stage treatment may be performed by using an aqueous solution of fatty acid. Aromatic acid (such as benzoic acid; but the disclosure is not limited thereto) has low water solubility, so it is difficult to prepare a high-concentration aqueous solution at room temperature to dissolve nylon. Moreover, compared to nylon, other non-nylon fibers (such as polyester fibers or other polymers containing aromatic groups) may be more difficult to be dissolved by fatty acids.

In an embodiment, the acid treatment of the first-stage treatment may be performed by using an aqueous solution of straight chain fatty acid. Compared with fatty acid with a same carbon number, the straight-chain fatty acid has better water solubility than fatty acid with side chains.

In an embodiment, the acid treatment of the first-stage treatment may be performed by using an aqueous solution of a straight chain fatty acid with a carbon number of 3 or less. The straight chain fatty acid with a carbon number of 3 or less may have better water solubility.

In an embodiment of the disclosure, the acid treatment of the first-stage treatment may be performed by using an aqueous solution of formic acid (i.e., methanoic acid, which may be secreted by hymenoptera such as ants, bees, etc.) or acetic acid (i.e., ethanoic acid, which may be produced by acetic acid bacteria). The formic acid and the acetic acid are biological acids found in nature, and are more eco-friendly in terms of application and/or treatment (such as waste liquid treatment, but the disclosure is not limited thereto).

In an embodiment, the acid treatment of the first-stage treatment may be performed by using an aqueous solution of formic acid. Compared with the acetic acid, the formic acid dissolves nylon more easily.

In an embodiment, the acid treatment of the first-stage treatment may be performed by using 99 wt % formic acid aqueous solution.

In an embodiment, the first solid material may include other non-nylon polymers (such as polyester). However, it should be noted that the disclosure does not exclude that the first solid material further includes a small amount of nylon.

In an embodiment, the first liquid material may include acid liquid and nylon or nylon suspension dissolved in the acid liquid.

In an embodiment, regarding a total amount of nylon in the aforementioned recyclable, the amount of nylon in the first liquid material is about 75 wt % to 90 wt %, and the amount of nylon in the first solid material is correspondingly about 25 wt % to 10 wt %.

[Second-Stage Treatment]

A second-stage treatment is performed on the aforementioned first liquid material to obtain a second liquid material and a second solid material.

In the embodiment, the second-stage treatment may include dilution. For example, a solvent used in the acid treatment in the aforementioned first-stage treatment may be added to the first liquid material, and then the second liquid material and the second solid material may be separated from each other by an appropriate method (such as: filtering with a screen or standing still for separation, but the disclosure is not limited thereto).

In an embodiment, the method of the second-stage treatment may further include cooling the solution after adding the aforementioned solvent to the aforementioned first liquid material (for example, cooling to the room temperature (about 25° C.); or, cooling to below the room temperature and above the freezing point), but the disclosure is not limited thereto.

In an embodiment, the method of the second-stage treatment may further include stirring and/or leaving the solution to stand still (for example: stirring for 3 minutes and standing still for 30 minutes or more, or, stirring for 5 minutes and standing still for 60 minutes or more) after adding the aforementioned solvent to the aforementioned first liquid material, but the disclosure is not limited thereto.

In an embodiment, the first-stage treatment may include performing the acid treatment of the first-stage treatment by using 99 wt % formic acid aqueous solution, and the second-stage treatment may include adding water to the aforementioned first liquid material to reduce a concentration of the formic acid in the solution to about 60 wt %-70 wt %.

In an embodiment, the second solid material may include nylon.

In an embodiment, the second liquid material may include acid liquid and nylon or nylon suspension dissolved in the acid liquid. A concentration of an acidic substance in the second liquid material is lower than a concentration of an acidic substance in the first liquid material.

[Third-Stage Treatment]

A third-stage treatment is performed on the aforementioned first solid material to obtain a third liquid material and a third solid material.

In the embodiment, the third-stage treatment may include acid treatment. In an embodiment, a method of the acid treatment of the third-stage treatment may be similar to the method of the acid treatment of the first-stage treatment. For example, the aforementioned first solid material may be immersed in acid liquid, and then the third liquid material and the third solid material may be separated from each other by a suitable method (such as filtering with a screen, but the disclosure is not limited thereto).

In an embodiment, the acid treatment of the third-stage treatment may be to immerse the first solid material in acid liquid for heating (for example, heated to about 70±5° C. to 100±5° C.), but the disclosure is not limited thereto.

In an embodiment, the acid treatment of the third-stage treatment may be to immerse the first solid material in acid liquid and stir and/or leave for standing still (for example, stirring and/or standing still for more than 30 minutes; or, stirring and/or standing still for more than 60 minutes), but the disclosure is not limited thereto.

In an embodiment, a solute and solvent used in the acid treatment of the third-stage treatment may be the same or similar to the solute and solvent used in the acid treatment of the first-stage treatment.

In an embodiment, an acid concentration of the acid treatment in the third-stage treatment is different from the acid concentration of the acid treatment in the first-stage treatment; and the acid concentration of the acid treatment in the third-stage treatment is different from the acid concentration of the second liquid material.

In an embodiment, the acid concentration of the acid treatment in the third-stage treatment is less than the acid concentration of the acid treatment in the first-stage treatment; and the acid concentration of the acid treatment in the third-stage treatment is greater than the acid concentration of the second liquid material.

In an embodiment, the formic acid aqueous solution of 99 wt % may be first mixed with a recycled formic acid aqueous solution with a concentration of about 60 to 70 wt %, and then the above mixed solution may be used as acid liquid for the acid treatment of the third-stage treatment. In this way, an overall usage amount of formic acid may be reduced. In an embodiment, a concentration of the formic acid in the aforementioned mixed solution may be greater than 80 wt %, which may have a better dissolving effect on nylon.

In an embodiment, the aforementioned recycled formic acid aqueous solution may include the second liquid material obtained by performing the second-stage treatment (including: the second liquid material obtained in the current treatment cycle; and/or the second liquid material obtained in the previous treatment cycles after the method of the disclosure is performed by multiple times); and/or, a fourth liquid material obtained after a fourth-stage treatment (details thereof are as follows) performed in the previous treatment cycles (the method of the disclosure is performed by multiple times). In this way, the overall usage amount of the formic acid may be reduced, and the nylon or nylon suspension dissolved in the acid liquid of the recycled formic acid aqueous solution (such as the second liquid material and/or the fourth liquid material) may be further subsequently recycled, so as to increase the amount of nylon recycling.

In an embodiment, the third solid material may include other non-nylon polymers (such as polyester). However, it should be noted that the disclosure does not exclude that the third solid material further includes of a very small amount of nylon.

In an embodiment, a proportion of nylon in the third solid material (which may be a weight ratio of nylon to the entire third solid material) is less than a proportion of nylon in the first solid material (which may be a weight ratio of nylon to the entire first solid material).

In an embodiment, a proportion of polyester in the third solid material (which may be a weight ratio of polyester to the entire third solid material) is greater than a proportion of polyester in the first solid material (which may be a weight ratio of polyester to the entire first solid material).

In an embodiment, the third liquid material may include acid liquid and nylon or nylon suspension dissolved in the acid liquid.

In an embodiment, regarding a total amount of nylon in the first solid material, the amount of nylon in the third liquid material may be about 90 wt % or more; or 95 wt % or more. In other words, through the two-stage acid treatment (i.e., the acid treatment in the first-stage treatment and the acid treatment in the third-stage treatment), the nylon in the aforementioned recyclable may almost be dissolved and separated in the subsequent steps.

[Fourth-Stage Treatment]

A fourth-stage treatment is performed on the aforementioned third liquid material to obtain a fourth solid material and a fourth liquid material.

In the embodiment, the fourth-stage treatment may include dilution. For example, a solvent used in the acid treatment in the aforementioned first-stage treatment or the aforementioned third-stage treatment may be added to the third liquid material, and then the fourth liquid material and the fourth solid material may be separated from each other by an appropriate method (such as: filtering with a screen or standing still for separation, but the disclosure is not limited thereto).

In an embodiment, the method of the fourth-stage treatment may further include cooling the solution after adding the aforementioned solvent to the aforementioned third liquid material (for example, cooling to the room temperature (about 25° C.); or, cooling to below the room temperature and above the freezing point), but the disclosure is not limited thereto.

In an embodiment, the method of the fourth-stage treatment may further include stirring and/or leaving the solution to stand still (for example: stirring for 3 minutes and standing still for 30 minutes or more, or, stirring for 5 minutes and standing still for 60 minutes or more) after adding the aforementioned solvent to the aforementioned third liquid material, but the disclosure is not limited thereto.

In an embodiment, the first-stage treatment may include performing the acid treatment of the first-stage treatment by using 99 wt % formic acid aqueous solution, and the third-stage treatment may include performing the acid treatment of the third-stage treatment by using two-stage formic acid aqueous solutions with different concentrations, and the fourth-stage treatment may include adding water to the aforementioned third liquid material to reduce a concentration of the formic acid in the solution to about 60 wt %-70 wt %.

In an embodiment, the fourth solid material may include nylon.

In an embodiment, the fourth liquid material may include acid liquid and nylon or nylon suspension dissolved in the acid liquid. A concentration of an acidic substance in the fourth liquid material is lower than a concentration of an acidic substance in the third liquid material.

[Recycling and Reuse of Nylon]

Recycling and reuse of nylon may be basically implemented on the second solid material and/or the fourth solid material including nylon in a suitable manner (such as nylon drawing or nylon granulation; but the disclosure is not limited thereto).

In an embodiment, the second solid material and/or the fourth solid material may be further washed with water to reduce the concentration of the acid liquid in the second solid material and/or the fourth solid material, but the disclosure is not limited thereto.

In an embodiment, the second solid material and/or the fourth solid material may be dried, but the disclosure is not limited thereto.

[Recycling and Reuse of Polyester]

Recycling and reuse of polyester may be basically implemented on the third solid material including polyester in a suitable manner (such as polyester granulation; but the disclosure is not limited thereto).

In an embodiment, the third solid material may be further washed with water to reduce the concentration of the acid liquid in the third solid material, but the disclosure is not limited thereto.

In an embodiment, the third solid material may be dried, but the disclosure is not limited thereto.

INDUSTRIAL APPLICATION

By using the method of the disclosure, nylon or polyester in the recyclable may be recycled. In addition, the recycled nylon or polyester may be reused. The reuse method is, for example, but not limited to fabrication of fabrics, curtains, tires and other nylon-containing materials. The disposal method of recycled polyester includes physical reproduction or chemical reproduction. The physical reproduction includes using an extruder to melt the processed polyester and then extrude for pelletizing. The chemical reproduction includes using a chemical depolymerization solution to depolymerize the recycled polyester, and then repolymerizing monomers and/or oligomers obtained after depolymerization under specific conditions to perform granulating, where the chemical depolymerization solution may be water, methanol, ethanol, ethylene glycol, diethylene glycol or any combination thereof. The disposal method of the recycled polyester may be deduced by referring to Taiwan patent application No. 110113065 and/or US patent application Ser. No. 17/320,247.

What is claimed is:

1. A disposal method for waste fabric containing polyester and nylon, comprising:
   step (a): providing a waste fabric containing polyester and nylon;
   step (b): performing a first-stage treatment on the waste fabric to obtain a first liquid material and a first solid material;
   step (c): performing a second-stage treatment on the first liquid material to obtain a second liquid material and a second solid material;
   step (d): performing a third-stage treatment on the first solid material to at least obtain a third liquid material and a third solid material; and
   step (e): performing a fourth-stage treatment on a third liquid material to obtain a fourth liquid material and a fourth solid material, wherein
   the first-stage treatment comprises acid treatment;
   an acid concentration of the second liquid material is lower than an acid concentration of the first liquid material;
   the third-stage treatment comprises acid treatment;
   an acid concentration of the acid treatment of the third-stage treatment is less than an acid concentration of the acid treatment of the first-stage treatment;
   the acid concentration of the acid treatment of the third-stage treatment is greater than the acid concentration of the second liquid material;
   an acid concentration of the fourth liquid material is lower than an acid concentration of the third liquid material; and
   the third solid material comprises recycled polyester, the second solid material comprises recycled nylon, or the fourth solid material comprises recycled nylon.

2. The disposal method for waste fabric containing polyester and nylon as claimed in claim 1, wherein the third solid material comprises recycled polyester, the second solid material comprises recycled nylon, and the fourth solid material comprises recycled nylon.

3. The disposal method for waste fabric containing polyester and nylon as claimed in claim 1, wherein
   the second-stage treatment comprises dilution; or
   the fourth-stage treatment comprises dilution.

4. The disposal method for waste fabric containing polyester and nylon as claimed in claim 3, wherein
the second-stage treatment comprises dilution; and
the fourth-stage treatment comprises dilution.

5. The disposal method for waste fabric containing polyester and nylon as claimed in claim 1, wherein the acid treatment of the first-stage treatment or the acid treatment of the third-stage treatment is to perform the acid treatment by only using an aqueous solution of straight chain fatty acid.

6. The disposal method for waste fabric containing polyester and nylon as claimed in claim 5, wherein the acid treatment of the first-stage treatment and the acid treatment of the third-stage treatment is to perform the acid treatment by only using the aqueous solution of straight chain fatty acid.

7. The disposal method for waste fabric containing polyester and nylon as claimed in claim 1, wherein the acid treatment of the first-stage treatment or the acid treatment of the third-stage treatment comprises performing the acid treatment by using formic acid or acetic acid.

8. The disposal method for waste fabric containing polyester and nylon as claimed in claim 7, wherein the acid treatment of the first-stage treatment and the acid treatment of the third-stage treatment comprises performing the acid treatment by using formic acid or acetic acid.

9. The disposal method for waste fabric containing polyester and nylon as claimed in claim 1, wherein the step (a), the step (b), the step (c), the step (d), and the step (e) are executed in sequence.

10. The disposal method for waste fabric containing polyester and nylon as claimed in claim 1, wherein
performing the step (a), the step (b), and the step (d) by N times, wherein N is 1 or more;
performing the step (c) by M times, wherein M is less than or equal to N; and
the acid treatment of the third-stage treatment of an $N^{th}$ time comprising performing the acid treatment by using the second liquid material of an $M^{th}$ time.

11. The disposal method for waste fabric containing polyester and nylon as claimed in claim 1, wherein
performing the step (a), the step (b), the step (d), and the step (e) by N times, wherein N is 2 or more;
the acid treatment of the third-stage treatment of an $N^{th}$ time comprising performing the acid treatment by using the fourth liquid material of a $P^{th}$ time, wherein P is smaller than N.

12. The disposal method for waste fabric containing polyester and nylon as claimed in claim 1, wherein acid liquid used in the acid treatment of the third-stage treatment is mixed liquid mixed with the second liquid material.

* * * * *